United States Patent
Some et al.

(10) Patent No.: US 6,937,282 B1
(45) Date of Patent: Aug. 30, 2005

(54) METHOD AND APPARATUS FOR CORRECTING DISTORTION ABERRATION IN POSITION AND DENSITY IN DIGITAL IMAGE BY USING DISTORTION ABERRATION CHARACTERISTIC

(75) Inventors: Masato Some, Kaisei-machi (JP); Seishi Ikami, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/415,201

(22) Filed: Oct. 12, 1999

(30) Foreign Application Priority Data

Oct. 12, 1998 (JP) ................................. 10/289269

(51) Int. Cl.[7] ........................................... H04N 5/225
(52) U.S. Cl. ..................................... 348/335; 348/340
(58) Field of Search ............................... 348/335, 241, 348/340, 187, 188; 358/540; 359/16

(56) References Cited

U.S. PATENT DOCUMENTS

| | | | |
|---|---|---|---|
| 5,675,380 A | * | 10/1997 | Florent et al. .............. 348/247 |
| 5,818,527 A | * | 10/1998 | Yamaguchi et al. ........ 348/335 |
| 6,211,911 B1 | * | 4/2001 | Komiya et al. ............. 348/335 |
| 6,476,869 B1 | * | 11/2002 | Sekine et al. ............... 348/335 |

* cited by examiner

Primary Examiner—Tuan Ho
Assistant Examiner—Nhan T. Tran
(74) Attorney, Agent, or Firm—Sughrue Mion, PLLC

(57) ABSTRACT

A method and an apparatus for correcting influences of a distortion aberration of a lens in an image formed on an image surface by the lens. Distortions of respective portions of the image are corrected according to a distortion aberration characteristic of the lens. The distortion aberration characteristic indicates distortions at respective distances from an optical axis of the lens on the image surface. Then, a value of at least one kind of information belonging to each point of the image in which the distortions are corrected is determined based on values of the at least one kind of information belonging to points around a corresponding point in the image before the correction. Further, the density or brightness values of the predetermined pixels after the correction of the positions may be further corrected in consideration of the change of areas due to the distortion of the image.

11 Claims, 5 Drawing Sheets

F I G. 3a
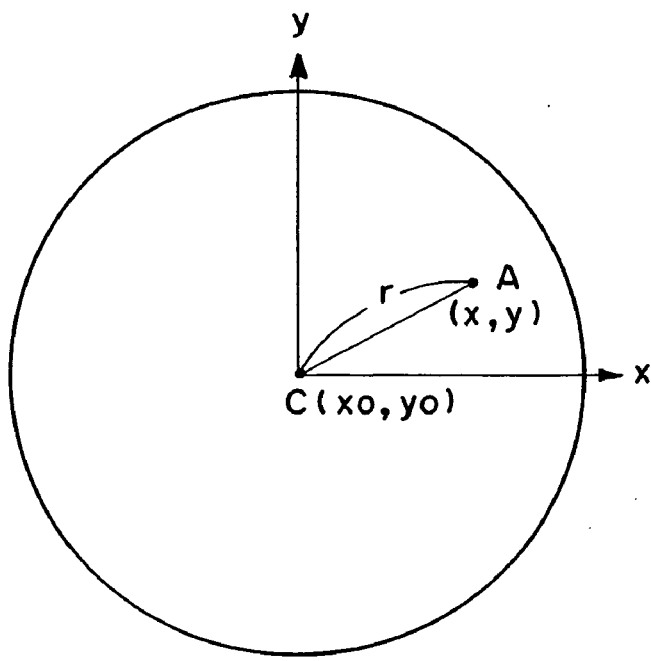
F I G. 3b
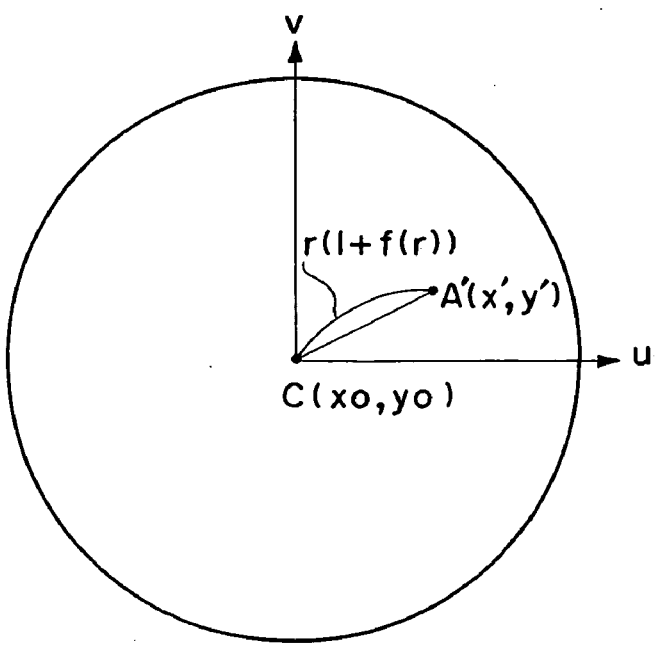

F I G. 4a
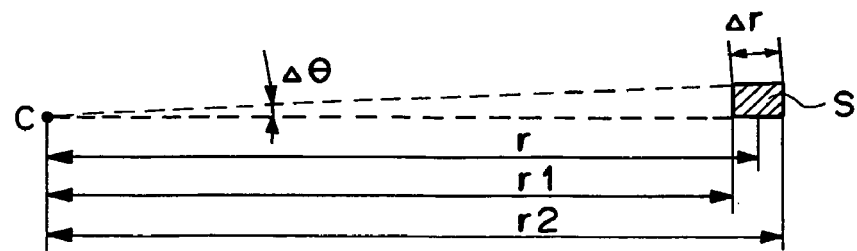
F I G. 4b
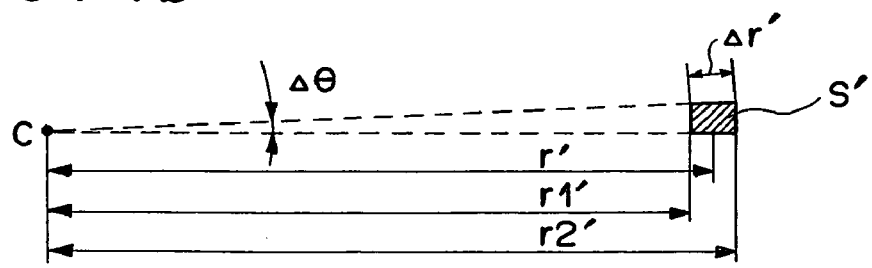

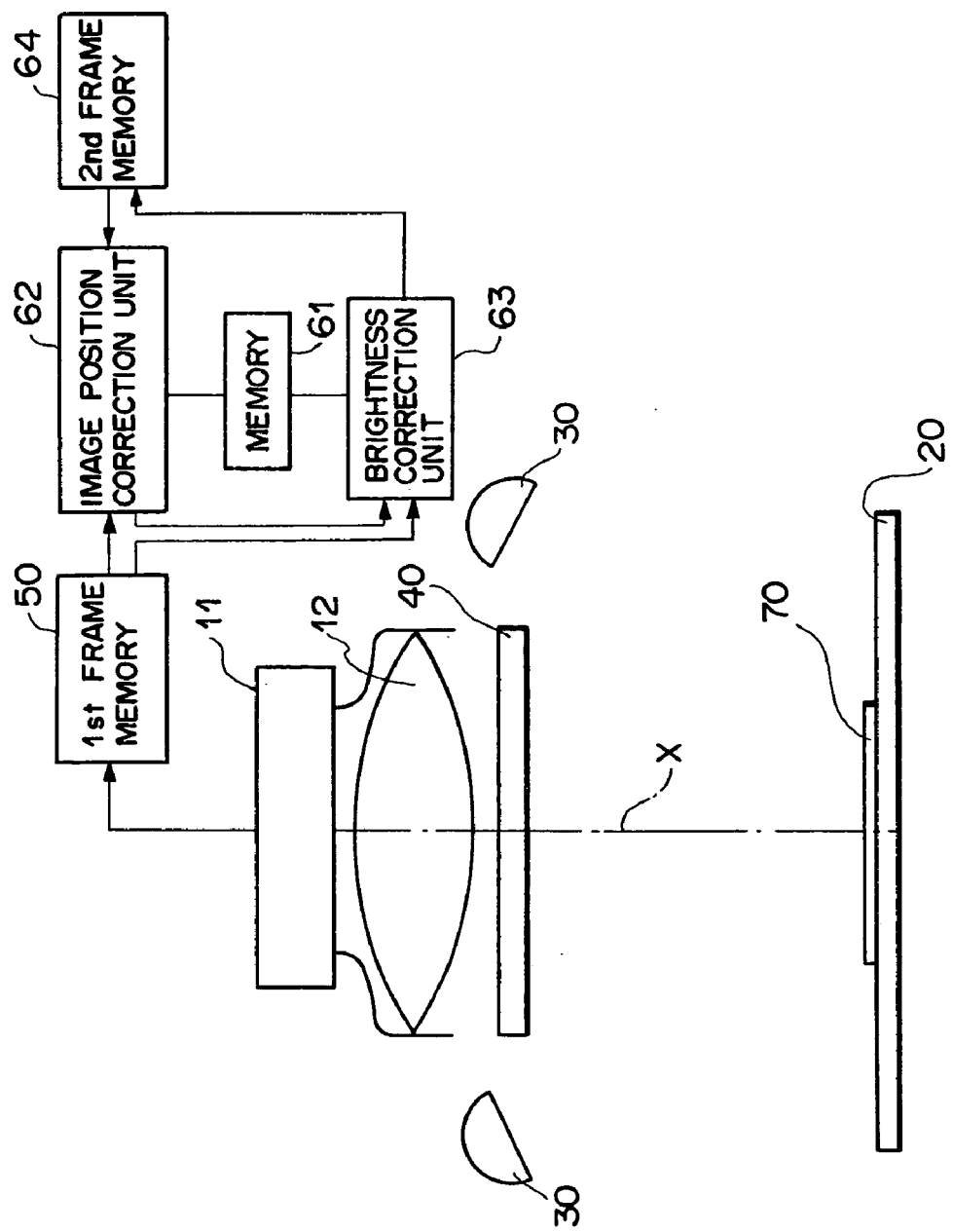
F I G. 5

METHOD AND APPARATUS FOR CORRECTING DISTORTION ABERRATION IN POSITION AND DENSITY IN DIGITAL IMAGE BY USING DISTORTION ABERRATION CHARACTERISTIC

BACKGROUND OF THE INVENTION

1. Field of the Invention

The present invention relates to a method and an apparatus for correcting influence of distortion aberration of a lens on image information.

2. Description of the Related Art

Various types of aberration, such as spherical aberration, coma aberration, astigmatism, field curvature, and distortion aberration, are known as aberration of a lens. Usually, these types of aberration are suppressed within a desired range for observing an image of an object by improving an optical system.

However, the above types of aberration are inter-related. For example, if one of the above types of aberration is suppressed, another type of aberration may increase. Therefore, it is not possible to completely eliminate all the types of aberration at the same time. Thus, conventionally, some of the above types of aberration may be selectively suppressed based on characteristics of devices in which the lens is used, or all the types of aberration are suppressed as much as possible based on consideration of the balance among them.

Recently, image digitization is being widely utilized. Typically, images formed by a lens are directly digitized by using a photoelectric reading device such as a CCD (charge-coupled device), or analog images recorded in a film or the like are digitized by reading them by a scanner. In the case wherein images are processed after digitization, it is not necessary to completely suppress the aberration when images are formed by an optical system. In particular, it is relatively easy to suppress influences of the distortion aberration by performing signal processing on digitized images (image information).

In the conventional technique, influences of the distortion aberration in a digitized image are usually corrected by using affine transformations. However, in the technique using the affine transformation, each image is divided into a plurality of polygons and each polygon is deformed based on corresponding points in the plurality of polygons. Therefore, it is very complicated and impractical to correct influences of an aberration such as the distortion aberration of a lens by using the affine transformation, where the influences are symmetric with respect to an optical axis. In particular, it is difficult to correct the image with high accuracy.

In addition, it is not possible to perform accurate quantitative image analysis based on a (photographic) density or brightness thereof since the density or brightness of each portion of the image varies due to the distortion.

SUMMARY OF THE INVENTION

An object of the present invention is to provide a method and an apparatus for correcting influences of distortion aberration of a lens on an image formed by the lens, wherein accuracy of position information and density information of the image is improved.

According to the first aspect of the present invention, there is provided a method for correcting influences of distortion aberration of a lens on an image formed by the lens, wherein position information and at least one kind of image information (an image data value or image data values) belonging to each position of the image are corrected according to a distortion aberration characteristic of the lens.

The above "at least one kind of image information belonging to each position" may include a density or brightness (luminance) value of each pixel, and other various signal values belonging to each pixel.

More particularly, according to the present invention, positions and the above at least one kind of information belonging to respective portions of an image formed on an image surface by a lens having the distortion aberration are corrected according to a distortion aberration characteristic which indicates distortions at respective distances from an optical axis in the image, respectively.

Preferably, first, positions in the image before the correction of the positions, corresponding to predetermined positions in the image after the correction of the positions, are obtained based on the distortion aberration characteristic. Then, the above at least one kind of information belonging to each of the obtained positions in the image before the correction of the positions is obtained, as the above at least one kind of information belonging to a corresponding one of the above predetermined positions in the image after the correction of the positions, based on values of the above at least one kind of information belonging to one or more pixels in the image before the correction of the positions near each of the above obtained positions by using a nearest point approximating method, interpolation, or the like.

Since positions in the image surface vary due to the distortion (aberration), areas of microscopic regions of the image surface also vary due to the variation of the positions caused by the distortion aberration. Therefore, among various kinds of information belonging to each position of the image, at least one kind of information which depends on an area, such as densities, brightness, and the like, also varies depending upon the variation (distortion) in the position information. Thus, the density or brightness values of the predetermined pixels after the correction of the positions, which are obtained as above, may be further corrected in consideration of the change of areas due to the distortion of the image.

According to the second aspect of the present invention, there is provided an apparatus for correcting influences of distortion aberration of a lens, in a first image formed on an image surface by the lens. The apparatus according to the second aspect of the present invention is provided for executing the method according to the first aspect of the present invention. The apparatus contains an image reading unit for reading a first image formed on the image surface by the above lens, a distortion aberration characteristic storing unit for storing a distortion aberration characteristic of the lens, where the distortion aberration characteristic indicates distortions at respective distances from an optical axis on the image surface, a distorted position determining unit for determining distorted positions in the first image read by the image reading unit, corresponding to predetermined positions in a second image in which the distortions are corrected, and a position-dependent information obtaining unit for obtaining at least one kind of image information (an image data value or image data values) belonging to the above predetermined positions based on the distortion aberration characteristic.

When the method and apparatus according to the first and second aspects of the present invention are used, influences of distortion aberration in position information and the at least one kind of image information (an image data value or image data values) belonging to each position of the image, such as densities or brightness of each pixel, can be corrected with high accuracy according to the distortion aberration characteristic of the lens. Therefore, the accurate correction of the position information and the at least one kind of image information belonging to each position can be carried out very easily. Thus, for example, when the quantitative image analysis is performed on digital images from which influences of distortion aberration are eliminated by the present invention, the accuracy of the analysis can be remarkably improved, compared with the result of the conventional technique. In addition, even if a lens having a serious distortion aberration is used, a high degree of accuracy can be achieved by use of the present invention. In other words, the same degree of accuracy as that is achieved by the conventional technique can be achieved by using a less expensive lens according to the present invention.

BRIEF DESCRIPTION OF THE DRAWINGS

In the drawings:

FIG. 3a is a diagram illustrating a point of an image from which influences of the distortion aberration are eliminated;

FIG. 3b is a diagram illustrating a point of an image formed by a lens having a distortion aberration;

FIG. 4a is a diagram illustrating a microscopic region of the image from which influences of the distortion aberration are eliminated;

FIG. 4b is a diagram illustrating a microscopic region of the image formed by the lens having the distortion aberration; and FIG. 5 is a block diagram illustrating the construction of the image information readout apparatus, which contains the apparatus according to the second aspect of the present invention.

DESCRIPTION OF THE PREFERRED EMBODIMENTS

The embodiments of the present invention are explained below with reference to the drawings. Although, hereinafter, explanations are provided for one or both of (photographic) density and brightness as examples of the aforementioned at least one kind of information belonging to each position of an image, it will be understood that the following explanations are also applicable for other kinds of information belonging to each position of the image.

Correction of Distortion and Density

Figure 1:
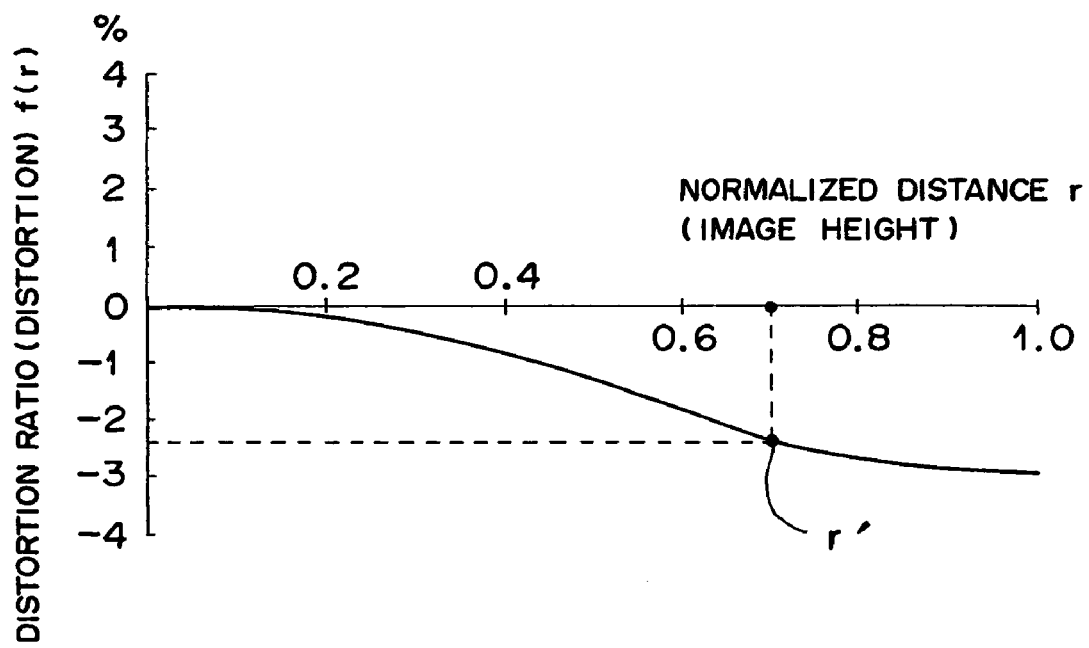
FIG. 1 is a diagram illustrating a distortion aberration characteristic of a lens.

Usually, the distortion aberration characteristic of a lens is determined on an image surface as illustrated in FIG. 1. That is, FIG. 1 illustrates a relationship, on an image surface, between an ideal image height (abscissa) and a distortion amount due to the distortion aberration corresponding to the image height (ordinate), where the "ideal image height" is a height of an image when no distortion aberration exists. In FIG. 1, the image height r is normalized, and the distortion amount is indicated by a distortion ratio $f(r)=(r'-r)/r$, where r is the normalized image height, i.e., the normalized distance from the optical axis on the image surface, and r' is the distance after being deformed by the distortion aberration.

Position information of an image actually formed on an image surface, i.e., position information of an image influenced by the distortion aberration, can be corrected based on the distortion aberration characteristic, to obtain ideal position information in the image in which distortions are eliminated.

When an image formed on a predetermined image surface (influenced by the distortion aberration) is corrected based on the distortion aberration characteristic, values (e.g., a density value, a luminance value, and the like) of each pixel after the correction are requested to be output in a storage medium such as a frame memory in a liquid crystal display device. In such a storage medium, pixel positions are predetermined. If the position information (coordinates) of one of the predetermined pixels is corrected based on the distortion aberration characteristic, the corrected coordinates may not exactly correspond to coordinates of one of the predetermined pixels. Therefore, according to the present invention, preferably, a value (e.g., a density value, a luminance value, and the like) of each of the above predetermined pixels in the image in which the distortions are corrected is obtained based on a value or values of one or more pixels around a pixel corresponding to the each of the above predetermined pixels in the image in which the distortions are corrected, by using a nearest point approximating method, interpolation, or the like.

For example, when the distortion aberration characteristic is expressed by the distortion ratio $f(r)=(r'-r)/r$, as illustrated in FIG. 1, the correction is performed in accordance with the following procedure.

(i) The position of the optical axis on the image surface is assumed to be the origin (0, 0).

(ii) The distance r to a point (x, y) in the corrected image which is not distorted is obtained.

(iii) A point (x', y') in the distorted image, corresponding to the above point (x, y) in the corrected image, is obtained based on the following equations (1) and (2).

$$x'=x\{1+f(r)\} \quad (1)$$

$$y'=y\{1+f(r)\} \quad (2)$$

(iv) The density D' of the point (x', y') is obtained based on the density or densities of one or more image points (u, v) located near the point (x', y') in the distorted image by using a nearest point approximating method, interpolation, or the like, where u and v are integers. Thus, the density D' of the point (x', y') in the distorted image is obtained as the density D' of the point (x, y) in the corrected image.

The values of the distortion ratio f(r) for the distance values r may be stored in advance in a lookup table, and in the above operation (iii), the value of the distortion ratio f(r) is obtained by referring to the lookup table.

Correction by Equations (1) And (2)

The correction of the position (coordinates) and densities according to the equations (1) and (2) are explained below with reference to FIGS. 2, 3a, and 3b.

Figure 2:
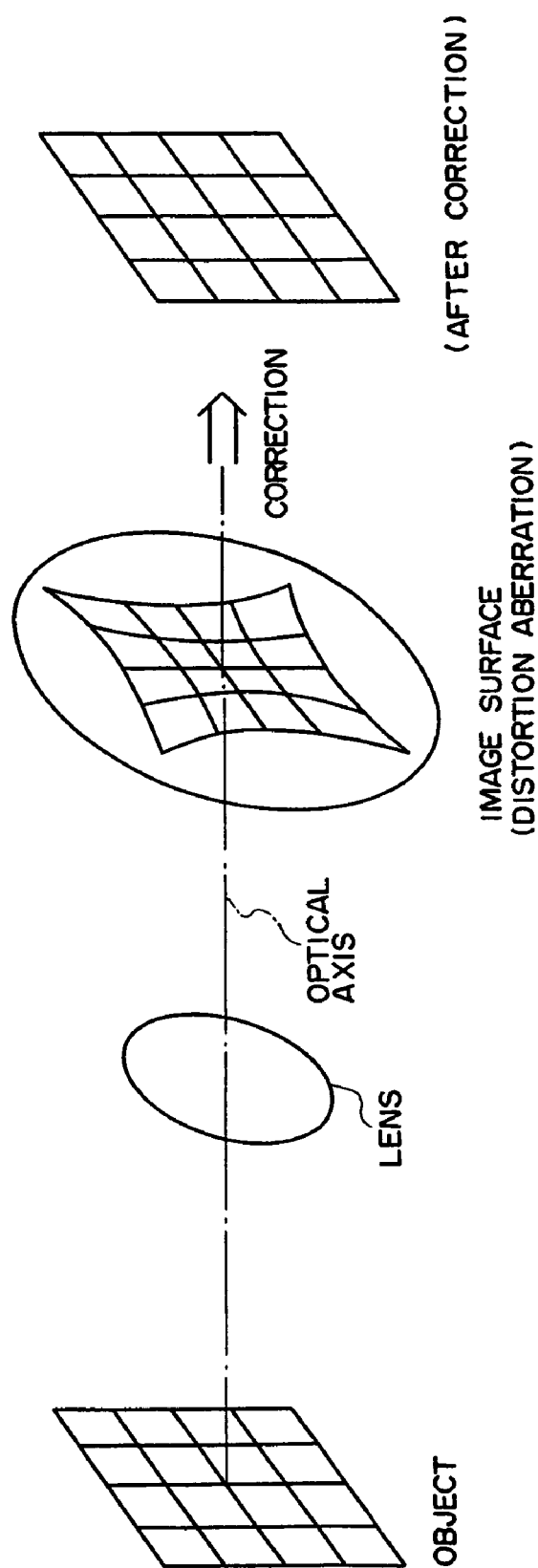
FIG. 2 is a diagram illustrating a construction in which an image of an object is formed on an image surface by a lens having a distortion aberration characteristic.

FIG. 2 shows a scene in which an image of an object is formed on an image surface by a lens having a distortion aberration characteristic. In FIG. 2, a square lattice is indicated as the object, and the image of the square lattice formed on the image surface is distorted, and is then corrected. The distortion aberration characteristic is indicated, for example, by the distortion ratio $f(r)=(r'-r)/r$, as illustrated in FIG. 1, where r is the distance from the optical axis on the image surface.

FIG. 3a shows coordinates (x, y) of a point A and the distance $r(=(x^2+y^2)^{1/2})$ thereto from the optical axis on the image surface, in an ideal (corrected) image which is not affected by a distortion aberration, i.e., an image from which influences of the distortion aberration are eliminated, and FIG. 3b shows coordinates (x', y') of a point A' and the distance $r'(=(x'^2+y'^2)^{1/2})$ thereto from the optical axis on the image surface, in an image actually formed by a lens having the distortion aberration, i.e., a distorted image which is affected by the distortion aberration, where the above point A in the ideal (corrected) image corresponds to the point A' in the actual (distorted) image. The relationship of the equations (1) and (2) exists between the coordinates (x, y) of the point A and the coordinates (x', y') of the point A'. That is, due to the distortion aberration, the ideal image point A is shifted to the point A' in the distorted (actual) image. As explained before, the ideal image point A is located at a predetermined position, for example, corresponding to one of a plurality of pixel positions of a frame memory.

As explained before, the density D' of the above point (x', y') is obtained based on the density or densities of one or more (for example, four) image points (u, v) located around the image point (x', y') by using a nearest point approximating method, interpolation, or the like, where u and v are integers, and the density D' of the point (x', y') of the distorted image is recognized as the density D' of the corresponding image point (x, y) of the corrected image.

Thus, data of the corrected image can be produced by performing the above operation for all of the predetermined points of the corrected image.

Although all of the above explanations relating to the equations (1) and (2) are provided for density, these explanations are also applicable to other kinds of information (such as brightness) belonging to each pixel of an image.

Further Correction of Density

A method for correcting variations in the density caused by the distortion aberration with higher accuracy is explained below.

As the distortion aberration characteristic is determined as illustrated in FIG. 1, the position information varies due to the distortion aberration. That is, areas of microscopic regions in the image surface also vary due to the variation of the position information caused by the distortion aberration. Thus, densities on the image surface also vary depending upon the position information, i.e., depending upon the distortion aberration characteristic.

Therefore, the density value D' of the point (x, y) in the corrected image, obtained by the above steps (i) to (iv), may be corrected for the above variation of areas of microscopic regions of the image, based on the distortion aberration characteristic.

For example, the density D' of the image point (x, y) obtained by the above steps (i) to (iv) can be further corrected by the following equation (3) to obtain a further corrected value D of the density of the image point (x, y).

$$D=D'\times\{1+f(r)\}\times\{1+r\times f'(r)+f(r)\}, \quad (3)$$

where $f'(r)=\Delta f(r)/\Delta r$

Derivation of Equation (3)

Next, the aforementioned further correction by using the equation (3) is explained below with reference to FIGS. 3a, 3b, 4a, and 4b.

FIG. 4a shows a microscopic region around the image point A in FIG. 3a having an area S, and FIG. 4b shows a microscopic region around the image point A' in FIG. 3b having an area S'. When it is assumed that the microscopic region of the area S in the corrected image corresponds to the microscopic region of the area S' in the distorted image, the following relationship exists between the density D of the microscopic region of the area S in the corrected image and the density D' of the microscopic region of the area S' in the distorted image:

$$D\times S=D'\times S'$$

That is, $$D=D'\times S'/S \quad (4)$$

As indicated in FIG. 4a, the microscopic region of the area S in the image after the correction is defined as a difference between a sector having a radius r2 and a central angle $\Delta\theta$ and a sector having a radius r1 and the same central angle $\Delta\theta$, where $$r1=r-\Delta r/2, \text{ and} \quad (5)$$

$$r2=r+\Delta r/2 \quad (6)$$

That is, $$S=(r2^2-r1^2)\times\Delta\theta/2 \quad (7)$$

Similarly, as indicated in FIG. 4b, the microscopic region of the area S' in the image before the correction is defined as a difference between a sector having a radius r2' and a central angle $\Delta\theta$ and a sector having a radius r1' and the same central angle $\Delta\theta$. That is, $$S=(r2'^2-r1'^2)\times\Delta\theta/2 \quad (8)$$

Due to the distortion aberration characteristic, $$r1'=r1\{1+f(r1)\}, \text{ and} \quad (1')$$

$$r2'=r2\{1+f(r2)\} \quad (2')$$

Therefore, the ratio S'/S of areas is written as $$S'/S=\{(r1'+r2')\times(r1'-r2')\}/\{(r1+r2)\times(r1-r2)\} \quad (9)$$

From the definitions of r1 and r2 in the equations (5) and (6), $$r1+r2=2r, \text{ and} \quad (10)$$

$$r2-r1=\Delta r \quad (11)$$

In addition, from the relationships (1') and (2'), $$r1'+r2'=2r+r\{f(r1)+f(r2)\}+\{f(r2)-f(r1)\}\Delta r/2, \text{ and}$$

$$r2'-r1'=\Delta r+r\{f(r2)-f(r1)\}+\{f(r1)+f(r2)\}\Delta r/2$$

Therefore, the equation (9) is written as $$S'/S = [1+\{f(r1)+f(r2)\}/2 + \{f(r2)-f(r1)\}\Delta r/(4r)] \times [1+r\{f(r2)-f(r1)\}\Delta r+\{f(r1)+f(r2)\}/2] \quad (9')$$

When $\Delta r\to 0$, $$f(r1)+f(r2)\to 2f(r), \text{ and}$$

$$\{f(r2)-f(r1)\}/\Delta r\to \Delta f(r)/\Delta r=f'(r)$$

Substituting these approximations into the equation (9'), $$S'/S =\{1+f(r)\}\times\{1+r\times f'(r)+f(r)\}, \quad (9")$$

where $$f(r)=(r'-r)/r, \text{ and}$$

$$f'(r)=\Delta f(r)/\Delta r$$

Substituting the equation (9") into the equation (4), the equation $$D=D'\times\{1+f(r)\}\times\{1+r\times f'(r)+f(r)\} \quad (3)$$

is obtained.

Thus, the density D' obtained by the steps (i) to (iv) can be further corrected to the density D by the equation (3).

Although all of the above explanations relating to the (equation (3) are provided for density, these explanations are also applicable to other kinds of information (such as brightness) belonging to each pixel of an image when the information satisfies the equation (4).

Another Coordinate System

Although, in the above examples, the origin of the coordinate system is located at the position of the optical axis in the image surface, generally, the position of the optical axis may not be the origin. When the coordinates of the position of the optical axis in the image surface is (x0, y0), the equations (1) and (2) should be replaced with the following equations (1") and (2")

$$x=(x'-x0)/\{1+f(r)\}+x0 \quad (1")$$

$$y=(y'-y0)/\{1+f(r)\}+y0 \quad (2')$$

In this case, the distance from the optical axis to the point (x, y) is $$r=\{(x-x0)^2+(y-y0)^2\}^{1/2}$$

Applications of the Invention

The method and apparatus according to the first and second aspects of the present invention can be utilized in the fields of biochemistry and molecular biology. For example, the method and apparatus according to the first and second aspects of the present invention can be used in a quantitative image analysis performed on an image formed by light (chemiluminescence or fluorescence) emitted from a sample, where the sample is dropped or spread on a microtitre plate or a microarray chip (DNA chip). In this application, the image of the sample is formed by a lens on a light receiving surface (as the image surface) of the image reading unit such as a charge-coupled device (CCD). In particular, the method and apparatus according to the first and second aspects of the present invention is suitable for determining, with high accuracy, positions and luminous intensities of weak light emitted from the above sample.

Construction of Apparatus

FIG. 5 is diagram illustrating the construction of an image information readout apparatus as an embodiment of the second aspect of the present invention.

In FIG. 5, reference numeral 11 denotes a cooled charge-coupled device (CCD), 12 denotes a lens, 20 denotes a sample holder, 30 denotes light sources, 40 denotes an excitation light cutoff filter, 50 denotes a first frame memory, 61 denotes a memory, 62 denotes a pixel position correction unit, 63 denotes a brightness correction unit, 64 denotes a second frame memory, and 70 denotes a sample.

The sample 70 is held on the sample holder 20. For example, in this embodiment, an organic material is distributed in the sample 70, and the organic material is labeled by a fluorescent dye. The fluorescent dye emits fluorescent light when exposed to excitation light. The light sources 30 emit the excitation light to be applied to the sample 70. The excitation light cutoff filter 40 cuts off the excitation light scattered by the sample 70, and passes only the fluorescent light emitted from the sample 70. The lens 12 condenses the fluorescent light emitted from the sample 70, and forms an image of the fluorescent light on an imaging surface (a light-receiving surface of the charge-coupled device (CCD) 11). The image formed by the lens 12 is affected by the distortion aberration of the lens 12, i.e., the formed image is distorted. The charge-coupled device (CCD) 11 has a plurality of solid-state imaging elements arrayed in a plane. The solid-state imaging elements correspond to a plurality of pixels, and have their light-receiving surfaces in the imaging surface. Signals representing the above image of the fluorescent light are generated by the charge-coupled device (CCD) 11, and are transferred to the first frame memory 50. The first frame memory 50 has a plurality of storage areas corresponding to the plurality of pixels, receives the above signals representing the image of the fluorescent light from the charge-coupled device (CCD) 11, and stores therein the image information for one frame. The memory 61 stores the distortion aberration characteristic of the lens 12, for example, as illustrated in FIG. 1. The second frame memory 64 is provided for storing information on a distortion-corrected image from which distortions due to the distortion aberration of the lens 11 are eliminated, and has areas for storing image information for each pixel of the distortion-corrected image. The image position correction unit 62 first performs calculation to obtain a position (the aforementioned position of the coordinates (x', y')) in the first frame memory 50 corresponding to (an address for) each pixel of the distortion-corrected image, based on the distortion aberration characteristic stored in the memory 61 by using the equations (1) and (2). The brightness correction unit 63 performs calculation to obtain a brightness D' of the above position in the first frame memory 50 obtained by the position correction unit 62, based on brightness values D1', D2', D3', and D4' of four nearest pixels (respectively having coordinates (u1, v1), (u2, v2), (u3, v3), and (u4, v4)) in the image stored in the first frame memory 50 around the above position calculated by the position correction unit 62, by using interpolation. Then, the brightness correction unit 63 further performs the calculation of the equation (3) to obtain a further corrected brightness value D corresponding to each pixel of the image to be stored in the second frame memory 64. Thus, the corrected brightness values D for all of the pixels of the distortion-corrected image are stored in the second frame memory 64. If a very accurate correction of the brightness values is not required, the correction by the equation (3) may not be performed.

As explained above, with the image information readout apparatus of FIG. 5, the distortion-corrected image obtained in the second frame memory 64 is not affected by the distortion aberration of the lens 12. Therefore, the quantitative image analysis can be performed with high accuracy.

Others

Further, the method and apparatus according to the first and second aspects of the present invention can be also utilized in other fields of technology. For example, the method and apparatus according to the first and second aspects of the present invention can be used for digital images produced by digitizing photographic images produced on silver films by conventional cameras.

In addition, all of the contents of the Japanese patent application, No. 10(1998)-289269 are incorporated into this specification by reference.

What is claimed is:

1. A method for correcting influences of a distortion aberration of a lens in an image formed on an image surface by said lens, wherein distortions and at least one kind of an image information belonging to each position of the image are corrected according to a distortion aberration characteristic of the lens, and the distortion aberration characteristic indicates distortions at respective distances from an optical axis of the lens on said image surface, wherein the distortion aberration characteristic is expressed by a distortion ratio $f(r)=(r'-r)/r$, where the distances from the optical axis on said image surface after correction of said position information are denoted by r, and said distances from the optical axis on said image surface before correction of said position information are denoted by r', points of the image before the correction having coordinates (x', y') corresponding to predetermined points of the image after the correction having coordinates (x, y) are obtained based on equations, $$x'=x\{1+f(r)\}, \text{ and}$$

$$y'=y\{1+f(r)\},$$

where a position of the optical axis on the image surface is assumed to have coordinates (0, 0), and values of said at least one kind of image information at the corresponding points of the image before the correction having the coordinates (x', y') are obtained, as values D' of said at least one kind of image information at said predetermined points of the image after the correction having the coordinates (x, y), based on a value or values of said at least one kind of image information at one or more image points having the coordinates (u, v) located near each of the corresponding points having the coordinates (x', y') on the image before the correction, where u and v are integers.

2. A method according to claim 1, wherein said values D' of said at least one kind of image information at said predetermined points of the image after the correction having the coordinates (x, y) are further corrected by an equation $$D=D'\times\{1+f(r)\}\times\{1+r\times f'(r)+f(r)\},$$

to obtain further corrected values D of said at least one kind of image information at said predetermined points of the image after the correction having the coordinates (x, y).

3. An apparatus for correcting influences of a distortion aberration of a lens in a first image formed on an image surface by said lens, said apparatus comprises;

an image reading unit for reading the first image formed on the image surface by the lens;

a distortion aberration characteristic storing unit for storing a distortion aberration characteristic of the lens, where the distortion aberration characteristic indicates distortions at respective distances from an optical axis on the image surface;

a distorted position determining unit for determining distorted positions in the first image read by the image reading unit, corresponding to predetermined positions in a second image in which said distortions are corrected; and a position-dependent information obtaining unit for obtaining at least one kind of image information belonging to the above predetermined positions based on the distortion aberration characteristic, wherein the distortion aberration characteristic is expressed by a distortion ratio $f(r)=(r'-r)/r$, where the distances from the optical axis on said image surface after correction of said position information are denoted by r, and said distances from the optical axis on said image surface before correction of said position information are denoted by r', said position correcting unit obtains points of the image before the correction having coordinates (x', y') corresponding to predetermined points of the image after the correction having coordinates (x, y), based on equations, $$x'=x\{1+f(r)\}, \text{ and}$$

$$y'=y\{1+f(r)\},$$

where a position of the optical axis on the image surface is assumed to have coordinates (0, 0), and said position-dependent information obtaining unit obtains, as a value D' of said at least one kind of image information at each of said predetermined points of the second image having the coordinates (x, y), a value of said at least one kind of image information at a corresponding one of said points having the coordinates (x', y'), based on a value or values of said at least one kind of image information at one or more image points having the coordinates (u, v) located near said corresponding one of the points having the coordinates (x', y') in the first image, where u and v are integers.

4. An apparatus according to claim 3, wherein said density obtaining unit further corrects said values D' of said at least one kind of image information at said predetermined points of the second image having the coordinates (x, y), by an equation $$D=D'\times\{1+f(r)\}\times\{1+r\times f'(r)+f(r)\},$$

to obtain further corrected values D of said at least one kind of image information at said predetermined points of the second image having the coordinates (x, y).

5. An apparatus for correcting influences of a distortion aberration of the lens according to claim 3, further comprising:

a first frame memory which has a plurality of storage areas corresponding to a plurality of pixels of the first image;

a second frame memory which stores said second image in which said distortions are corrected; and wherein said distorted position determining unit obtains a position in a first frame memory corresponding to an address for each pixel of the distorted-corrected image in the second frame memory.

6. An apparatus for correcting influences of distortion aberration of the lens according to claim 3, wherein said distortion aberration characteristic indicates distortions at respective distances from a designated coordinate on the image surface.

7. An apparatus for correcting influences of distortion aberration of the lens according to claim 3, wherein said distortion aberration characteristic of the lens illustrates a relationship between an ideal image height and a distortion amount due to the distortion aberration corresponding to the image height.

8. An apparatus for correcting influences of distortion aberration of a lens according to claim 3, wherein said position-dependent information obtaining unit obtains at least one kind of image information of nearby pixels in the image stored in a first frame memory around the position obtained by the distorted position determining unit.

9. An apparatus according to claim 6, wherein the distortion aberration is determined by a correction criteria as a ratio of a measurement of the respective distance in uncorrected image data and the respective distance in corrected image data.

10. An apparatus according to claim 9, wherein the correction criteria remains consistent over each respective distance.

11. An apparatus according to claim 10, wherein said at least one kind of image information belonging to each position may be one of a density or brightness (luminance) value of each pixel of said image, and other various signal values belonging to each pixel of said image.

* * * * *